United States Patent
Sinz et al.

(10) Patent No.: US 7,107,754 B2
(45) Date of Patent: Sep. 19, 2006

(54) CHAIN IN PARTICULAR A HOIST CHAIN

(75) Inventors: Rolf Sinz, Heubach (DE); Hans Dalferth, Aalen (DE); Uwe Wistuba, Aalen (DE); Heribert Herzog, Aalen (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 253 days.

(21) Appl. No.: 10/492,995

(22) PCT Filed: Oct. 30, 2002

(86) PCT No.: PCT/DE02/04068

§ 371 (c)(1),
(2), (4) Date: Apr. 19, 2004

(87) PCT Pub. No.: WO03/038303

PCT Pub. Date: May 8, 2003

(65) Prior Publication Data

US 2004/0244354 A1  Dec. 9, 2004

(30) Foreign Application Priority Data

Oct. 30, 2001 (DE) .................. 101 54 901
Oct. 30, 2001 (DE) .................. 101 54 902

(51) Int. Cl.
*F16G 13/02* (2006.01)
*F16G 13/18* (2006.01)
*F16H 7/06* (2006.01)

(52) U.S. Cl. .................. 59/78; 59/84; 474/155; 474/206

(58) Field of Classification Search .......... 59/78, 59/80, 84; 474/155, 164
See application file for complete search history.

(56) References Cited

U.S. PATENT DOCUMENTS

| 2,650,470 | A | * | 9/1953 | Sennholtz | 59/90 |
|---|---|---|---|---|---|
| 3,410,085 | A |   | 11/1968 | Sheth |   |
| 3,453,823 | A | * | 7/1969 | Mundt | 59/90 |
| 4,627,232 | A | * | 12/1986 | Bruce | 59/84 |
| 6,170,248 | B1 | * | 1/2001 | Ianello et al. | 59/78 |
| 6,871,486 | B1 | * | 3/2005 | Moehnke et al. | 59/78 |
| 6,925,794 | B1 | * | 8/2005 | Dalferth et al. | 59/78 |

FOREIGN PATENT DOCUMENTS

| BE | 530775 | 8/1954 |
|---|---|---|
| DE | 3929148 | 1/1991 |
| EP | 0816717 | 1/1998 |
| GB | 2326145 | 12/1998 |

* cited by examiner

*Primary Examiner*—David Jones
(74) *Attorney, Agent, or Firm*—Mark P. Stone

(57) ABSTRACT

According to the invention, the resistance of the links of a D-profile chain may be increased, whereby the transitions between the flanks (2, 3) and the outer planar bearing surfaces of the links comprise roundings of radius r, which is 0.2 to 0.4 times the value of the separation (A) between the flanks of the chain links.

18 Claims, 2 Drawing Sheets

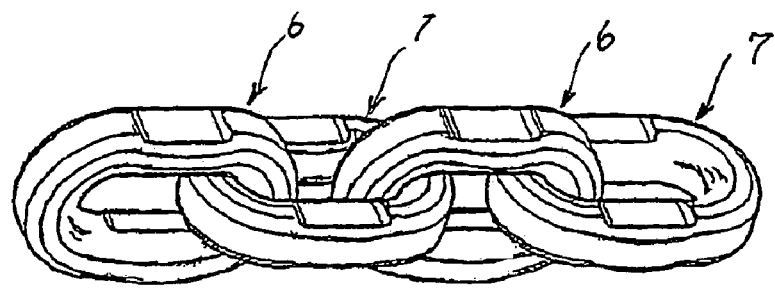
Fig. 4
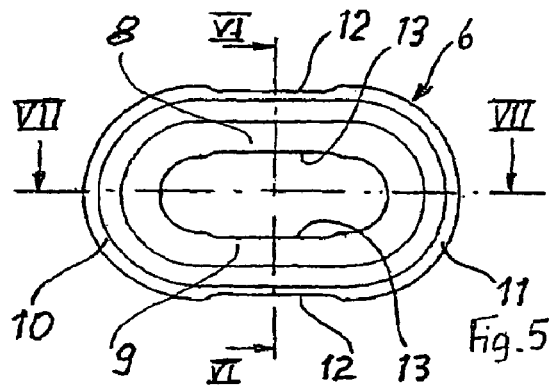
Fig. 5
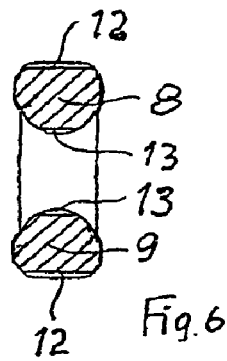
Fig. 6
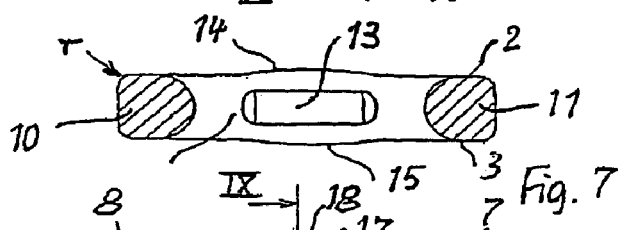
Fig. 7
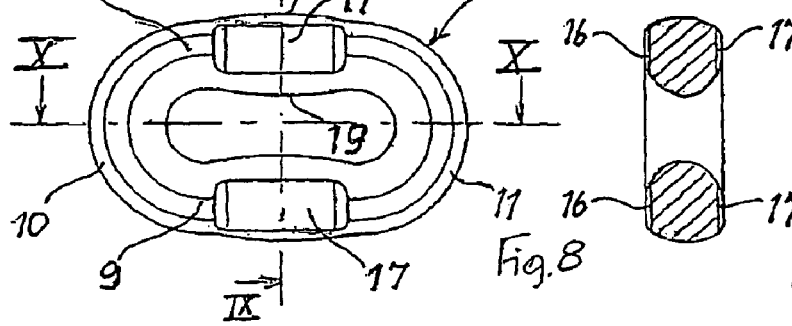
Fig. 8
Fig. 9
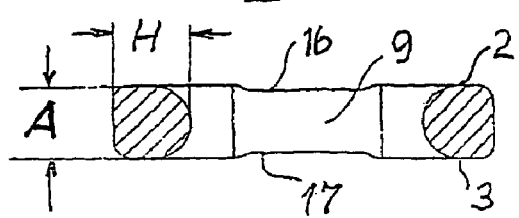
Fig. 10

CHAIN IN PARTICULAR A HOIST CHAIN

TECHNICAL FIELD

The invention relates to a chain, in particular case-hardened hoist chain, having chain links which are produced from D-profile steel sections and are rounded in the region of the transition between their flanks and their outer, essentially flat circumferential surface.

PRIOR ART

EP 0 816 717 A2, in addition to disclosing a chain of D-profile sections, in which the outer circumferential surface merges via sharp edges into the rectilinear flanks of the particular section, discloses a chain, in which the above-mentioned edges are slightly rounded, the radius of the rounding, as also in the case of other relevant chains used in practice, being very small in order to avoid a cross-sectional reduction in the link profile. In addition, the fact that it is considered a particular advantage of hoist chains having links which have a D-profile cross section that between the outer circumferential surfaces of the chain links of the chain and the supporting surfaces of the chain wheels driving and/or deflecting the chain, unlike in the case of the use of round steel chains, rather than a line-shaped support of the chain links, there is an extensive support of the same, the support resulting in a reduced surface pressure, which is proportional to the size of the supporting surfaces, and consequently to a reduced wear both of the chain wheels and of the chain links, is what favors the use of small rounding radii.

SUMMARY OF THE INVENTION

Investigations by the applicant have revealed that the progress obtained by the use of "D-profile links" and the associated reduction in surface pressure is kept within limits because the fatigue strength of relevant chain links leaves a considerable amount to be desired. The aim of the invention is to provide a remedy for this; it is consequently based on the object of increasing the fatigue strength, i.e. the dynamic strength of the chain links, while maintaining the supporting ratios, which are improved over the supporting ratios of round steel chains, between the chain links of D-profile chains and the chain wheels provided for them. This object is achieved according to the invention by the fact that the rounding radius in the region of the transition between the flanks and the outer, essentially flat circumferential surface of the chain links is equal to 0.2 to 0.4 times the value of the distance between the lateral flanks of the chain links.

The design according to the invention of the chain noticeably increases its dynamic strength and the service life of the chain, which is dependent on the latter, without a corresponding deterioration in the wear ratios having to be accepted. The cross-sectional reduction in the chain links that is associated with increasing size of the rounding radii does not prove disadvantageous, particularly since larger rounding radii open up the possibility of reducing the inner width of the chain links passing through the chain wheels, which likewise have a positive effect on the service life of the chain.

In cases in which the chain links of the chain are supported merely via their rounded ends on supporting surfaces of the chain wheels, the dynamic strength of the D-profile links can additionally be further increased by the fact that they are provided in the region of their longitudinal limbs, which are connected to each other by the rounded ends, with flattened zones which are produced by changing the initial cross section of said limbs by means of local, plastic deformation. In this case, the progress which is obtained is additionally added to not only by the partial cross-sectional change, but also the structural compression obtained by plastic deformation within the context of an upsetting process.

Further features and details of the invention emerge from the claims, the following description and the attached drawing.

BRIEF DESCRIPTION OF THE DRAWINGS

In the drawings:

FIG. 4 shows a short chain strand section having chain links which are produced from D-profile steel sections and which have been plastically deformed outside their rounded-end regions, FIG. 5 shows the side view of the first chain link illustrated on the left in FIG. 4, FIG. 6 shows a section along the line VI—VI in FIG. 5, FIG. 7 shows a section along the line VII—VII in FIG. 5, FIG. 8 shows the second chain link of the chain strand section according to FIG. 4, FIG. 9 shows a section along the line IX—IX in FIG. 8, and FIG. 10 shows a section along the line X—X in FIG. 8.

WAYS OF IMPLEMENTING THE INVENTION

Figure 1:
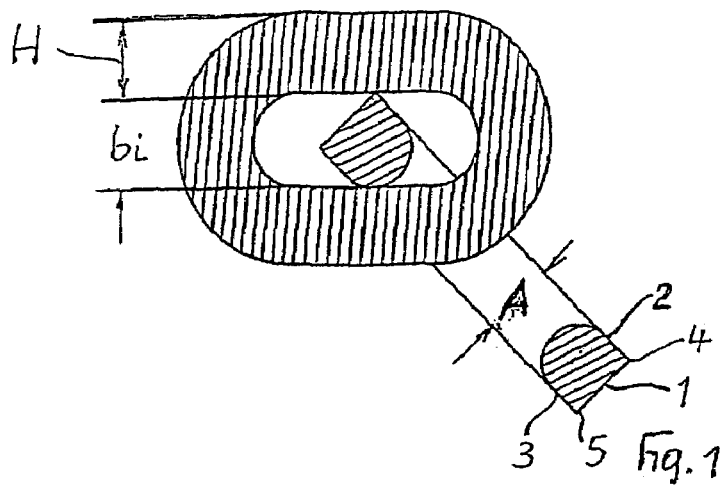
FIG. 1 shows a section through two chain links, which are angled with respect to each other by 45°, of a chain which is produced from D-profile steel sections and in which the D-profile steel sections are not rounded in the region of the transition between the outer circumference and the flanks of the links.

FIG. 1 illustrates two case-hardened chain links which are produced from D-profile sections by bending and welding and in which the outer circumferential surface 1 of the chain links and the flanks 2, 3 thereof merge into one another in each case forming right-angled edges 4, 5. It can be seen that the inner width bi of these chain links belonging to the prior art has to be larger than the inner width bi of the chain links, which are illustrated in FIGS. 2 and 3 and have at the transitions between their flanks 2, 3 and the outer circumferential surface 1 radii $r_1$ and $r_2$, of which the radius $r_1$ is 0.2 times and the radius $r_2$ 0.4 times the value of the distance A between the flanks 2, 3 of the links, the value A in the case illustrated being equal to the height H of the D-profile cross section in the region of the plane running through the centers of the two longitudinal limbs of the particular link.

Investigations have revealed that the flat circumferential and flank surfaces remaining between the respective radii $r_1$ and $r_2$ are of a sufficient size in order to keep the surface pressures effective between the chain links and the chain wheels serving to drive and guide the same within wear-preventing limits.

Figure 2:
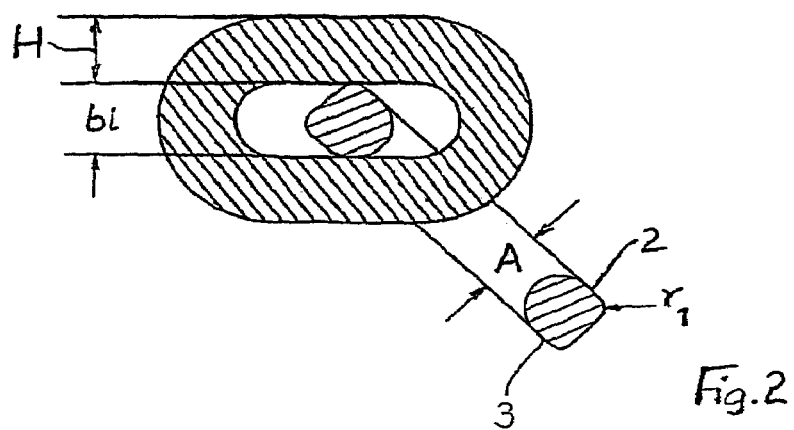
FIG. 2 shows a section through two chain links, which are angled with respect to each other by 45° and the D-profile of which has, in the region of the transition between the outer circumference and the flanks, a rounding radius in each case which is identical to 0.2 times the distance between the flanks of the links.
Figure 3:
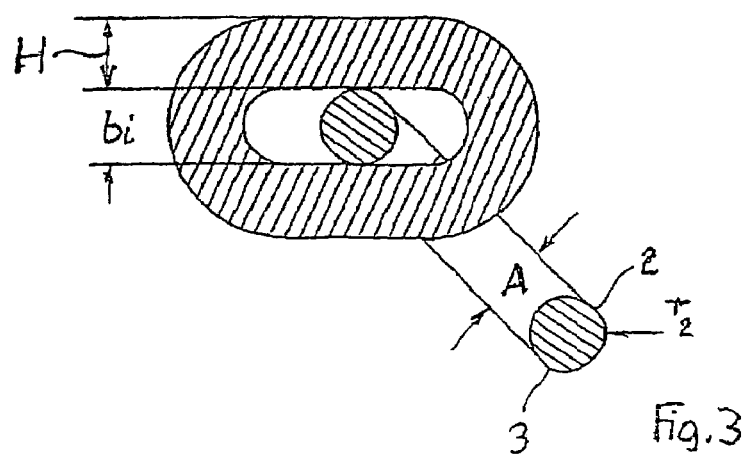
FIG. 3 shows a section through two chain links, which are angled with respect to each other by 45° and the D-profile of which has, in the region of the transition between the outer circumference and the flanks, a rounding radius in each case which is equal to 0.4 times the distance between the flanks of the links.

Unlike the dynamic strength of chains of D-profile steel sections according to the prior art with edges which are not rounded or are only minimally rounded, the dynamic strength which can be obtained for the chains having links according to FIGS. 2 and 3 does not in any way take second place to the dynamic strength of customary round steel chains.

The short chain piece which is illustrated in FIG. 4 and consists of four chain links has different chain links 6 and 7. In the case of the chain link 6 illustrated in FIGS. 5 to 7, the longitudinal limbs 8 and 9, which are connected to each other by rounded ends 10 and 11, are provided on opposite sides with flattened zones 12 and 13 which are produced by plastic deformation and, on opposite sides of the longitudinal limbs 8, 9, are oriented essentially perpendicular with respect to a plane running through the centers of the two longitudinal limbs 8, 9. The plastic deformation results in a compression of the material and displacement of the material in the region of the cross section of the longitudinal limbs 8 and 9, as can be seen with reference to the bulges 14 and 15 in FIG. 7. If a chain strand of the type illustrated in FIG. 4 is used, the links 6 would be arranged in such a manner that they pass through the particular pocket chain wheel as horizontal links while the links 7 would form vertical links.

In the case of the links 7 according to FIGS. 8 to 10, the longitudinal limbs 8 and 9 are provided on their respective opposite sides with flattened zones 16 and 17 which are oriented parallel to a plane running through the centers of the two longitudinal limbs 8 and 9. Also in the case of the links according to the FIGS. 8 to 10, there is a structural compression and displacement of material in the region of the longitudinal limbs 8 and 9 leading in this case to bulges 18 and 19 in the region of the longitudinal limbs 8 and 9.

Both in the case of the links 6 and in the case of the links 7 care should be taken to ensure that the D-profile cross section has, in the region of its outer circumference, a rounding radius r which is equal to 0.2 to 0.4 times the value of the distance A between the flanks of the chain links in the region of their rounded ends.

The invention claimed is:

1. A chain having oval chain links which are produced from sections of steel material having a D-profile cross section, said chain links having opposite, lateral flanks arranged at a distance (A) from one another, an essentially semicircular inner surface, an essentially flat outer surface, and rounded transition zones between said outer surface and said flanks, characterized in that the rounded transition zones of said chain links (6, 7) have a rounding radius ($r_1$, $r_2$) which is equal to 0.2 to 0.4 of the distance (A) between said opposite, lateral flanks (2, 3).

2. The chain as claimed in claim 1, characterized in that the D-profile cross section of the chain links has a height (H) which is at least equal to the distance (A) between the flanks (2, 3) of the links.

3. The chain as claimed in claim 1, characterized in that the chain links (6, 7) have longitudinal limbs (8, 9) which are connected by rounded ends (10, 11), said limbs (8, 9) comprising flattened zones (12, 13; 16; 17) which are produced by changing the initial D-profile cross section of said limbs by means of local, plastic deformation.

4. The chain as claimed in claim 3, characterized in that the longitudinal limbs (8, 9) of each second said chain link (6) of said chain have on opposite sides a flattened zone (12 and 13) oriented essentially perpendicular to a plane running through centers of said longitudinal limbs (8, 9).

5. The chain as claimed in claim 3, characterized in that the longitudinal limbs (8, 9) of each second said chain link (7) have on opposite sides a flattened zone (16 and 17) oriented essentially parallel to a plane running through centers of said longitudinal limbs (8, 9).

6. The chain as claimed in claim 3, characterized in that the initial D-profile cross section of the rounded ends of the chain links has a maximum height (H) which is at least equal to the distance (A) between the flanks (2, 3) of said rounded ends (10, 11).

7. The chain as claimed in claim 4, characterized in that the longitudinal limbs (8, 9) of each second said chain link (7) have on opposite sides a flattened zone (16 and 17) oriented essentially parallel to a plane running through centers of said longitudinal limbs (8, 9).

8. The chain as claimed in claim 3, characterized in that the initial D-profile cross section of the rounded ends of the chain links has a maximum height (H) which is at least equal to the distance (A) between the flanks (2, 3) of the rounded ends.

9. The chain as claimed in claim 5, characterized in that the initial D-profile cross section of the rounded ends of the chain links has a maximum height (H) which is at least equal to the distance (A) between the flanks (2, 3) of the rounded ends.

10. A case-hardened hoist chain having oval chain links which are produced from D-profile steel sections, said chain links having opposite, lateral flanks arranged at a distance (A) from one another, an essentially semicircular inner surface, an essentially flat outer surface, and rounded transition zones between said outer surface and said flanks, characterized in that the rounded transition zones of the chain links (6, 7) have a rounding radius ($r_1$, $r_2$) which is equal to 0.2 to 0.4 of the distance (A) between said opposite, lateral flanks (2, 3).

11. The chain as claimed in claim 10, characterized in that the D-profile cross section of the chain links has a height (H) which is at least equal to the distance (A) between the flanks (2, 3) of the chain links.

12. The chain as claimed in claim 10, characterized in that the chain links (6, 7) have longitudinal limbs (8, 9) which are connected by rounded ends (10, 11), said limbs (8, 9) comprising flattened zones (12, 13; 16; 17) which are produced by changing the initial D-profile cross section of said limbs by means of local, plastic deformation.

13. The chain as claimed in claim 12, characterized in that the longitudinal limbs (8, 9) of each second said chain link (6) of said chain have on opposite sides a flattened zone (12 and 13) oriented essentially perpendicular to a plane running through centers of said longitudinal limbs (8, 9).

14. The chain as claimed in claim 12, characterized in that the longitudinal limbs (8, 9) of each second said chain link (7) have on opposite sides a flattened zone (16 and 17) oriented essentially parallel to a plane running through centers of said longitudinal limbs (8, 9).

15. The chain as claimed in claim 12, characterized in that the initial D-profile cross section of the rounded ends of the chain links has a maximum height (H) which is at least equal to the distance (A) between the flanks (2, 3) of said rounded ends (10, 11).

16. The chain as claimed in claim 13, characterized in that the longitudinal limbs (8, 9) of each second said chain link (7) have on opposite sides a flattened zone (16 and 17) oriented essentially parallel to a plane running through centers of said longitudinal limbs (8, 9).

17. The chain as claimed in claim 13, characterized in that the initial D-profile cross section of the rounded ends of the chain links has a maximum height (H) which is at least equal to the distance (A) between the flanks (2, 3) of the rounded ends.

18. The chain as claimed in claim 14, characterized in that the initial D-profile cross section of the rounded ends of the chain links has a maximum height (H) which is at least equal to the distance (A) between the flanks (2, 3) of the rounded ends.

* * * * *